(12) United States Patent
Hosono (10) Patent No.: US 6,930,453 B2
(45) Date of Patent: Aug. 16, 2005

(54) POWER SUPPLY DEVICE FOR ENERGIZING DISCHARGE LAMP (75) Inventor: Hideaki Hosono, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 10/734,273

(22) Filed: Dec. 15, 2003

(65) Prior Publication Data
US 2004/0155605 A1 Aug. 12, 2004

(30) Foreign Application Priority Data
Jan. 22, 2003 (JP) ........................................ 2003-013878

(51) Int. Cl.[7] ................................................ G05F 1/00
(52) U.S. Cl. ........................ 315/291; 315/307; 315/308; 315/DIG. 4
(58) Field of Search ................................ 315/291, 307, 315/308, 224, 225, DIG. 4

(56) References Cited

U.S. PATENT DOCUMENTS 6,437,515 B1 * 8/2002 Kamoi et al. ............ 315/209 R
6,605,906 B2 * 8/2003 Okamoto et al. ............ 315/291

FOREIGN PATENT DOCUMENTS

| JP | 2001-52886 | 2/2001 |
| JP | 2002-110382 | 4/2002 |
| JP | 2002-231485 | 8/2002 |

* cited by examiner

Primary Examiner—Tuyet Thi Vo
(74) Attorney, Agent, or Firm—Young & Thompson (57) ABSTRACT A discharge lamp energizing power supply device has a full-wave rectifier circuit for rectifying an AC voltage obtained from a commercial AC power supply system into a full-wave rectified waveform, a booster circuit for boosting the voltage of the full-wave rectified waveform, a boosted-voltage changing circuit for changing the boosted voltage output from the booster circuit, a voltage lowering circuit for lowering an output voltage from the boosted-voltage changing circuit and outputting an activating output voltage for activating a discharge lamp and an energizing output voltage for keeping the discharge lamp energized, and a control device for controlling a boosted voltage in the boosted-voltage changing circuit within a predetermined range based on the voltage of the full-wave rectified waveform when the voltage lowering circuit outputs the energizing output voltage.

8 Claims, 8 Drawing Sheets

POWER SUPPLY DEVICE FOR ENERGIZING DISCHARGE LAMP

BACKGROUND OF THE INVENTION

1. Field of the Invention

The present invention relates to a discharge lamp energizing power supply device having a full-wave rectifier circuit for rectifying an AC voltage obtained from a commercial AC power supply system into a full-wave rectified waveform, a booster circuit for boosting the voltage of the full-wave rectified waveform, a boosted-voltage changing circuit for changing the boosted voltage output from the booster circuit, and a voltage lowering circuit for lowering an output voltage from the boosted-voltage changing circuit and outputting an activating output voltage for activating a discharge lamp to turn on the discharge lamp and an energizing output voltage for keeping the discharge lamp energized, and more particularly to a discharge lamp energizing power supply device for reducing a power loss for increased efficiency with respect to a wide range of power supply voltages and keeping a discharge lamp energized stably even when the discharge lamp is deteriorated.

2. Description of the Related Art

Heretofore, a discharge lamp energizing power supply device of the type described above (hereinafter referred to as "power supply device") needs a large pulse current during a period of time after it is supplied with a lamp energizing signal until a discharge lamp to be energized enters an arc discharge phase because of the characteristics of low-voltage discharge lamps. The power supply device is required to boost a DC voltage obtained from a commercial AC power supply system to a voltage of several hundred volts (V), e.g., DC 360 V, or higher to cause an electric discharge in the discharge lamp. The power supply device employs a known booster chopper as an AC/DC converter capable of rectifying an AC voltage into a high DC voltage by way of full-wave rectification.

The booster chopper outputs a boosted voltage higher than the voltage that is required to energize the discharge lamp in order to improve the power factor to a higher value. Therefore, the power supply device employs a voltage lowering chopper comprising a DC/DC converter as a voltage lowering circuit. The voltage lowering chopper lowers the boosted voltage produced by the booster chopper to the voltage that is required to energize the discharge lamp. Consequently, if a voltage of DC 360 V is required to energize the discharge lamp, then a boosted voltage higher than DC 360 V is required. The boosted voltage produced by the booster chopper needs to be higher than the maximum peak value of an allowable voltage range in order to prevent a noise margin from being affected. Therefore, a high boosted voltage value is required from this standpoint.

Generally, a power supply device which employs a voltage of AC 200 V from a commercial power supply system needs to handle input voltages in an allowable voltage range from 180 V to 270 V.

If the boosted voltage is to be constant regardless of the wide power supply voltage range, then the voltage boosting ratio tends to increase greatly. When the input power supply voltage is low, the voltage boosting ratio is very high, resulting in an increase in the power consumption and heat loss.

Japanese laid-open patent publication No. 2001-52886 discloses an energizing device incorporating therein a power supply device which has a sufficient noise margin and comprises a booster chopper capable of reducing the power consumption and heat loss and a control function.

The energizing device disclosed in the above publication has a power supply voltage detecting means connected to the input of the booster chopper of a booster circuit and a plurality of boosted voltage detecting means connected to the output of the booster chopper. The energizing device also has a control means for switching between the boosted voltage detecting means based on the power supply voltage detected by the power supply voltage detecting means, and controlling the booster chopper at a certain output voltage value when a switched output of the booster chopper is confirmed by the boosted voltage detecting means. The boosted voltage value is switched based on the power supply voltage.

A basic arrangement of the above power supply device will be described below with reference to FIG. 1 of the accompanying drawings.

Figure 1:
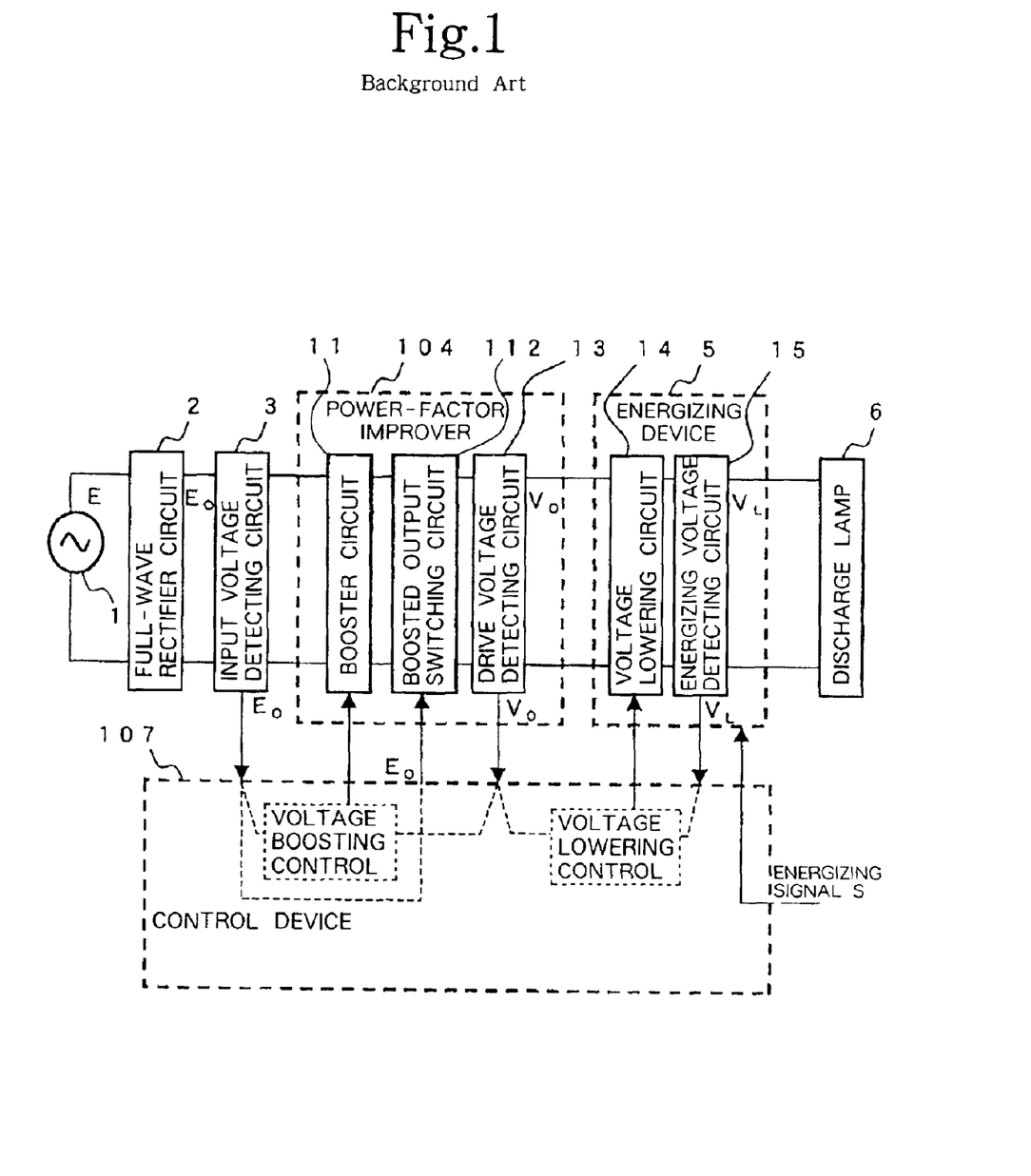
FIG. 1 is a block diagram of a basic arrangement of a conventional power supply device.

A power supply device shown in FIG. 1 comprises an AC/DC converter including full-wave rectifier circuit 2 for converting an input AC voltage E obtained from commercial AC power supply system 1 into a full-wave rectified waveform and booster circuit 11 for boosting a maximum rectified voltage value $E_O$ with a booster chopper and outputting the boosted voltage value, and a DC/DC converter including voltage lowering circuit 14 for lowering the boosted voltage and outputting the lowered voltage to keep discharge lamp 6 energized after discharge lamp 6 is turned on by an electric discharge therein.

Details of booster circuit 11 will be described below with reference to FIG. 2 of the accompanying drawings.

Figure 2:
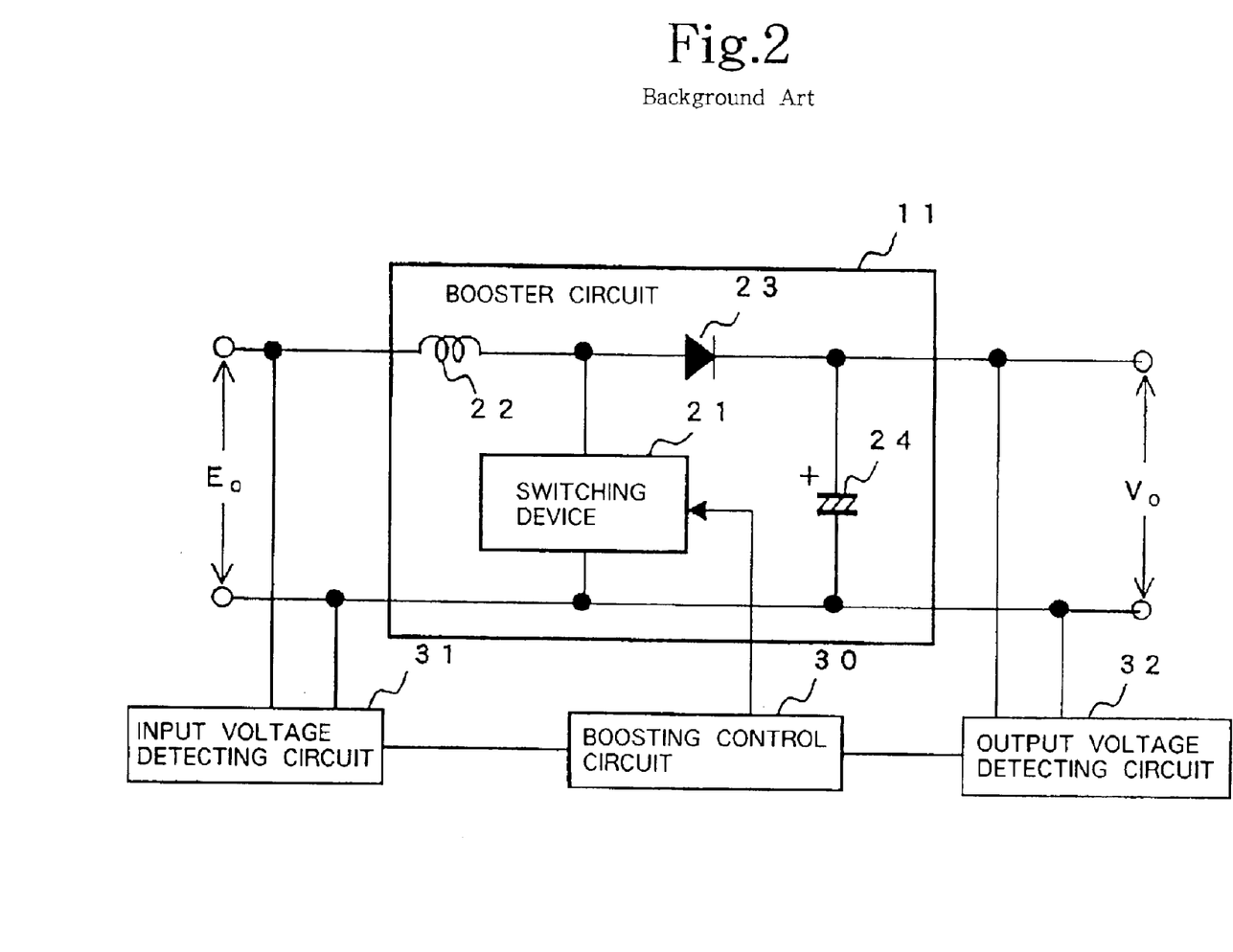
FIG. 2 is a circuit diagram, partly in block form, a booster chopper of the conventional power supply device shown in FIG. 1.

As shown in FIG. 2, booster circuit 11 cooperates with input voltage detecting circuit 31 and boosting control circuit 30 in making up the booster chopper. Booster circuit 11 has as its basic components switching device 21, choke coil 22, flywheel diode 23, and smoothing capacitor 24. The components of booster circuit 11 are arranged to produce at its output side an activating output voltage $V_O$ using an input voltage $E_O$ detected by input voltage detecting circuit 31 and an output voltage $V_O$ detected by output voltage detecting circuit 32.

The basic components and circuit arrangement of booster circuit 11 are well known in the art. Specifically, choke coil 22 and flywheel diode 23 are connected in series to each other from input to output terminals of booster circuit 11. Switching device 21 is connected to the junction between choke coil 22 and flywheel diode 23, and smoothing capacitor 24 is connected to the output terminal of flywheel diode 23 parallel to switching device 21. Technical details of booster circuit 11 will not be described below as they are of known nature.

Booster circuit 11 converts the input full-wave rectified voltage value $E_O$ into a DC voltage, boosts the DC voltage to the activating output voltage $V_O$ with an improved power factor, and outputs the activating output voltage $V_O$ to voltage lowering circuit 14 which comprises a voltage lowering chopper. Booster circuit 11 is included in power-factor improver 104.

Details of voltage lowering circuit 14 will be described below with reference to FIG. 3 of the accompanying drawings.

Figure 3:
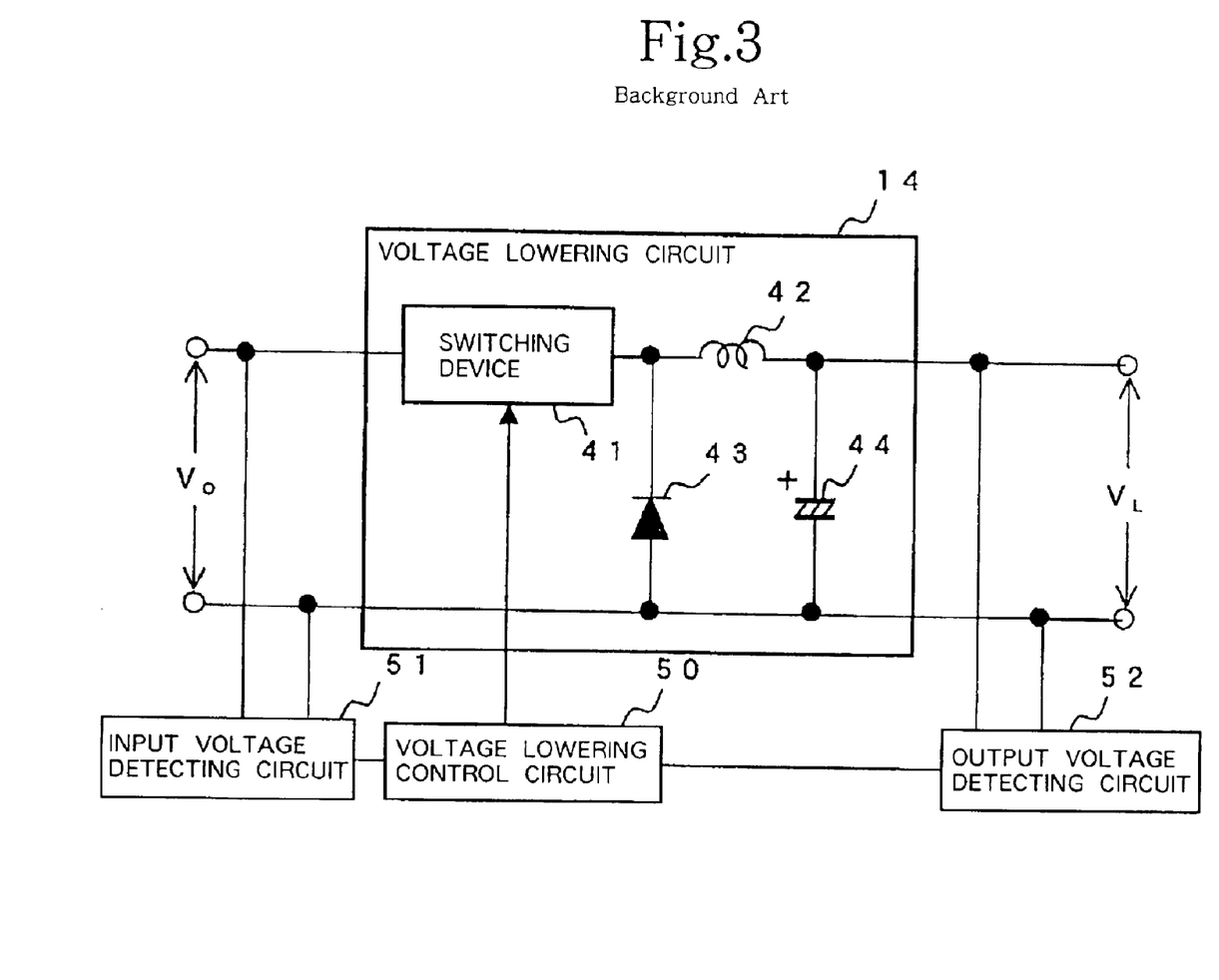
FIG. 3 is a circuit diagram, partly in block form, a voltage lowering chopper of the conventional power supply device shown in FIG. 1.

As shown in FIG. 3, voltage lowering circuit 14 cooperates with input voltage detecting circuit 51 and voltage lowering control circuit 50 in making up the voltage lowering chopper. Voltage lowering circuit 14 has as its basic components switching device 41, choke coil 42, flywheel diode 43, and smoothing capacitor 44. The components of voltage lowering circuit 14 are arranged to produce at its output side an energizing output voltage $V_L$ using an input voltage $V_O$ detected by input voltage detecting circuit 51 and an output voltage $V_L$ detected by output voltage detecting circuit 52.

The basic components and circuit arrangement of voltage lowering circuit 14 are well known in the art. Specifically, switching device 41 and choke coil 42 are connected in series to each other from input to output terminals of voltage lowering circuit 14. Flywheel diode 43 is connected to the junction between switching device 41 and choke coil 42, and smoothing capacitor 44 is connected to the output terminal of choke coil 42 parallel to flywheel diode 43. Technical details of voltage lowering circuit 14 will not be described below as they are of known nature.

In FIG. 1, energizing device 5 which includes voltage lowering circuit 14 turns on and off discharge lamp 6 in response to an energizing signal S that is input from outside of energizing device 5.

For turning on discharge lamp 6, energizing device 5 starts to operate with the energizing signal S. In response to the activating output voltage $V_O$ that is input from power-factor improver 104, the voltage lowering chopper of voltage lowering circuit 14 of the non-insulating type that is incorporated in energizing device 5 applies an ignition pulse to produce and output the energizing output voltage $V_L$. Discharge lamp 6, which may be a high-voltage mercury lamp, a metal halide lamp, or the like, develops an arc discharge therein in response to the energizing output voltage $V_L$, and maintains the arc discharge to remain continuously energized.

Rectified voltage detecting circuit 3 is connected to the output of full-wave rectifier circuit 2 for detecting its output voltage. Drive voltage detecting circuit 13 is disposed at the output of power-factor improver 104 for detecting its output voltage. Energizing voltage detecting circuit 15 is disposed at the output of energizing device 5 for detecting its output voltage. Booster circuit 11 and voltage lowering circuit 14 have their respective boosting and voltage lowering actions stabilized using their detected input and output voltages.

The drive voltage $V_O$ which is an output of power-factor improver 104 that is supplied with the commercial AC voltage is required, due to the boosting action, to have a voltage value which is equal to or greater than the rectified voltage value $E_O$ of the full-wave rectified waveform and has a sufficient voltage boosting ratio for obtaining a high power factor.

Power-factor improver 104 has a loss which is generally a main loss in the booster chopper. The loss caused by power-factor improver 104 is predominantly provided by a loss caused by switching device 21 of booster circuit 11. This loss is proportional to the drive voltage $V_O$ output by power-factor improver 104. Therefore, power-factor improver 104 is of higher efficiency as the drive voltage $V_O$ output thereby is lower, i.e., as the voltage boosting ratio is smaller.

Energizing device 5 has a loss which is generally a main loss in the voltage lowering chopper. The loss caused by energizing device 5 is predominantly provided by losses caused by switching device 41 and flywheel diode 43 of voltage lowering circuit 14. Of these losses, the loss caused by flywheel diode 43 that operates upon turn-offs is more predominant. This loss is proportional to an input voltage applied to energizing device 5, i.e., the drive voltage $V_O$ which is an output voltage of power-factor improver 104. Therefore, energizing device 5 has its efficiency made higher by lowering the drive voltage $V_O$ output by power-factor improver 104.

As described above, the total loss caused by power-factor improver 104 and energizing device 5 in the illustrated conventional circuit arrangement is maximum when a low voltage that requires a large voltage boosting ratio is input to power-factor improver 104. Consequently, power supply heat radiation requirements have to be designed in view of the loss caused when a low voltage is input.

According to the invention disclosed in Japanese laid-open patent publication No. 2001-52886, in order to reduce power consumption and heat loss in the power supply device which handles a wide range of DC power supply voltages, a control circuit switches between boosted voltages of the booster chopper based on the DC input voltage $E_O$ obtained from the commercial AC power supply system, and outputs a lower boosted voltage.

Specifically, as shown in FIG. 1, control device 107 is supplied with the maximum rectified voltage $E_O$ detected by rectified voltage detecting circuit 3 and obtained from the full-wave rectified output from the commercial AC voltage E, operates boosted output switching circuit 1 12 connected to the output of booster circuit 11 based on the rectified voltage $E_O$ to produce a lower boosted drive voltage $V_O$. Control device 107 operates boosted output switching circuit 112 to switch between two drive voltages, i.e., higher and lower drive voltages.

Figure 4:
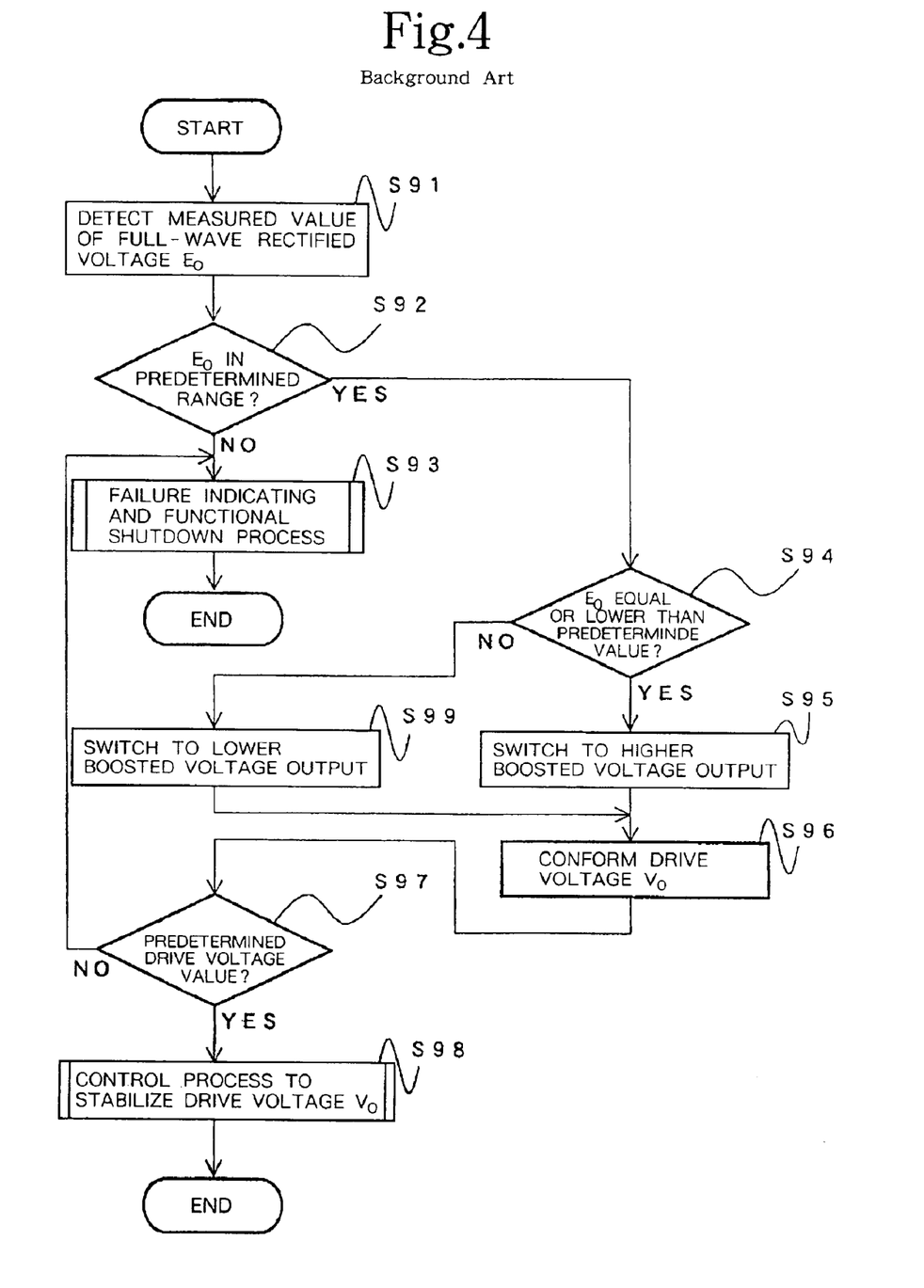
FIG. 4 is a flowchart of a major operation sequence of the conventional power supply device shown in FIG. 1.

Operation of control circuit 107 will be described below with reference to FIG. 4 of the accompanying drawings together with FIG. 1.

When the power supply device receives the AC voltage E obtained from commercial AC power supply system 1, full-wave rectifier circuit 2 converts the AC voltage E into the maximum rectified voltage $E_O$.

Rectified voltage detecting circuit 3 detects a measured value of the rectified voltage $E_O$ applied thereto in step S91. Control device 107 determines whether the measured value is in a predetermined range, e.g., a range from 180 V to 270 V, or not in step S92. If it is confirmed that the measured value is not in the predetermined range in step S92, then control device 107 performs a process for indicating a power supply input failure to the user and stopping its function in step S93.

If it is confirmed that the measured value is in the predetermined range in step S92, then control device 107 determines whether or not the measured value is equal to or smaller than a preset value, e.g., 200 V, or not in step S94. If it is confirmed that the measured value is equal to or smaller than the preset value in step S94, then control device 107 switches boosted output switching circuit 112 to the higher boosted voltage in step S95 to cause boosted output switching circuit 112 to output the higher output voltage. The output voltage is measured by drive voltage detecting circuit 13 as the drive voltage value $V_O$ in step S96. Thereafter, control device 107 determines whether or not the drive voltage value $V_O$ is a predetermined value of 200 V or not in step S97.

If it is confirmed that the measured value is in excess of the preset value in step S94, then control device 107 switches boosted output switching circuit 112 to the lower boosted voltage in step S99 to cause boosted output switching circuit 112 to output the lower output voltage. The output voltage is measured by drive voltage detecting circuit 13 as the drive voltage value $V_O$ in step S96. Thereafter, control device 107 determines whether or not the drive voltage value $V_O$ is the predetermined value of 200 V or not in step S97.

If it is confirmed that the drive voltage value $V_O$ is the predetermined value of 200 V in step S97, then control device 107 performs a control process to stabilize the confirmed drive voltage value $V_O$ in step S98. If it is confirmed that the drive voltage value $V_O$ is not the predetermined value of 200 V in step S97, then control goes back to step S93 in which control device 107 performs the process for indicating the power supply input failure to the user and stopping its function.

With power-factor improver 104, when the power supply voltage E is low, the output voltage of boosted output switching circuit 112 is high, and when the power supply Voltage E is high, the output voltage of boosted output switching circuit 112 is low. As a result, when the power supply Voltage E is low, the boosted value is held to a low level thereby to reduce power consumption and heat loss. When the power supply Voltage E is high, the boosted value is increased to output a drive output with a sufficient noise margin.

However, the conventional discharge lamp energizing power supply device is not suitable for use as a general-purpose power supply device which operates efficiently in a wider range of power supply voltages, e.g., a range from AC 100 V that is used in Japan to AC 240 V that is used in Europe.

The first reason is that with the above conventional arrangement, the rectified voltage value $E_O$ obtained from the power supply voltage E by way of full-wave rectification is in a given range only and can be switched to two values, and the booster circuit fails to operate when the power supply voltage is generated in excess of a predetermined voltage value.

The second reason is that the voltage lowering circuit is unable to operate when the energizing output voltage required by the discharge lamp exceeds an energizing output voltage output as an activating output voltage for reasons on the output side, e.g., a characteristic deterioration of the discharge lamp.

SUMMARY OF THE INVENTION

It is an object of the present invention to provide a discharge lamp energizing power supply device which is operable to reduce an electric power loss in a wide range of commercial power supply voltages employed in various parts of the world, and which can stably perform its functions without causing a functional shutdown of a boosting circuit due to an increase in the power supply voltage and a functional shutdown of a voltage lowering circuit due to a characteristic deterioration of a discharge lamp.

A discharge lamp energizing power supply device according to the present invention has a full-wave rectifier circuit for rectifying an AC voltage obtained from a commercial AC power supply system into a full-wave rectified waveform, a booster circuit for boosting the voltage of the full-wave rectified waveform, a boosted-voltage changing circuit for changing the boosted voltage output from the booster circuit, a voltage lowering circuit for lowering an output voltage from the boosted-voltage changing circuit and outputting an activating output voltage for activating a discharge lamp to turn on the discharge lamp and an energizing output voltage for keeping the discharge lamp energized, and a control device for controlling a boosted voltage in the boosted-voltage changing circuit within a predetermined range based on the voltage of the full-wave rectified waveform when the voltage lowering circuit outputs the energizing output voltage.

The discharge lamp energizing power supply device may further have an energizing voltage detecting circuit for detecting the output voltage of the voltage lowering circuit, and the control device may set the boosted voltage in the boosted-voltage changing circuit to a maximum value of the predetermined range if the output voltage of the voltage lowering circuit is detected as having reached the energizing output voltage by the energizing voltage detecting circuit while the boosted voltage in the boosted-voltage changing circuit is being set to a minimum value of the predetermined range.

The control device may control the boosted voltage in the boosted-voltage changing circuit in a predetermined range at the voltage value of the activating output voltage when the voltage lowering circuit outputs the activating output voltage.

The full-wave rectifier circuit may output a rectified voltage value $E_O$ as a maximum value of the full-wave rectified waveform produced from the AC voltage obtained from the commercial AC power supply system, the booster circuit and the boosted-voltage changing circuit jointly providing a power-factor improver for receiving the rectified voltage value $E_O$ of the full-wave rectified waveform, boosting the voltage value of the rectified voltage value $E_O$ to improve the power factor thereof, and outputting the boosted voltage value as an activating output voltage $V_O$, the voltage lowering circuit providing an energizing device for lowering the output voltage of the power-factor improver and outputting the activating output voltage $V_O$ for activating the discharge lamp to turn on the discharge lamp and the energizing output voltage $V_L$ for keeping the discharge lamp energized, the discharge lamp energizing power supply device may further have detecting circuits for detecting, respectively, the rectified voltage $E_O$ as an input voltage, the activating output voltage $V_O$, and the energizing output voltage $V_L$, and the control device may change the activating output voltage $V_O$ output from the power-factor improver in response to the detected voltages from the detecting circuits, change the activating output voltage $V_O$ output from the boosted-voltage changing circuit within a range from a minimum value $V_{Omin}$ to a maximum value $V_{Omax}$ based on the rectified voltage $E_O$ after the discharge lamp has started to operate stably, and control the boosted-voltage changing circuit to set the activating output voltage $V_O$ to the maximum value $V_{Omax}$ of the range when the output voltage of the energizing device reaches the energizing output voltage $V_L$ while the activating output voltage $V_O$ is being set to the minimum value $V_{Omin}$ of the range.

The range for the activating output voltage $V_O$ may extend from the minimum value $V_{Omin}$ to the maximum value $V_{Omax}$ based on the rectified voltage $E_O$, and may be divided into first, second, and third intervals which are successively arranged as the rectified voltage $E_O$ increases, and the control device may control the boosted-voltage changing circuit to keep the activating output voltage $V_O$ constant at the minimum value $V_{Omin}$ regardless of an increase in the rectified voltage $E_O$ in the first interval, to allow the activating output voltage $V_O$ to increase in proportion to the rectified voltage $E_O$ in the second interval, and to keep the activating output voltage $V_O$ constant at the maximum value $V_{Omax}$ regardless of an increase in the rectified voltage $E_O$ in the third interval.

The control device may have a delay circuit, and the control device may control the boosted-voltage changing circuit to increase the activating output voltage $V_O$ up to the maximum value $V_{Omax}$ and activates the delay circuit when an energizing signal S is received from outside of the discharge lamp energizing power supply device, and to reduce the activating output voltage $V_O$ to a voltage value in the range which is set based on the rectified voltage $E_O$ when the delay circuit confirms elapse of a predetermined period of time. In this arrangement, the range for the activating output voltage $V_O$ may extend from the minimum value $V_{Omin}$ to the maximum value $V_{Omax}$ based on the rectified voltage $E_O$, and may be divided into first, second, and third intervals which are successively arranged as the rectified voltage $E_O$ increases, and the control device may control the boosted-voltage changing circuit to keep the activating output voltage $V_O$ constant at the minimum value $V_{Omin}$ regardless of an increase in the rectified voltage $E_O$ in the first interval, to allow the activating output voltage $V_O$ to increase in proportion to the rectified voltage $E_O$ in the second interval, and to keep the activating output voltage $V_O$ constant at the maximum value $V_{Omax}$ regardless of an increase in the rectified voltage $E_O$ in the third interval.

The booster circuit may comprise a booster chopper having a sufficient voltage boosting ratio to achieve a high power factor under such condition as to make a maximum value of the rectified voltage $E_O$ in the first interval smaller than the minimum value $V_{Omin}$ of the activating output voltage $V_O$, and the voltage lowering circuit may comprise a voltage lowering chopper having a voltage lowering ratio required to operate the voltage lowering chopper under such conditions as to make the energizing output voltage $V_L$ smaller than the minimum value $V_{Omin}$ of the activating output voltage $V_O$.

Since the boosted voltage changing circuit can improve the power factor of the power-factor improve based on the rectified voltage $E_O$ at its input side, it is possible to set voltage boosting ratios for achieving successively effective high power factors with respect to a wide range of commercial power supplies from a commercial power supply of a lowest voltage, e.g., AC 100 V, to a commercial power supply of a highest voltage, e.g., AC 240 V. Because a functional shutdown of the voltage lowering circuit can be avoided when the boosted voltage changing circuit sets the activating output voltage $V_O$ in a continuous functional range of the voltage lowering circuit based on the discharging voltage or energizing output voltage $V_L$. The discharge lamp energizing power supply device according to the present invention is thus continuously energizing the discharge lamp.

The above and other objects, features, and advantages of the present invention will become apparent from the following description with reference to the accompanying drawings which illustrate an example of the present invention.

DETAILED DESCRIPTION OF THE PREFERRED EMBODIMENT

Figure 5:
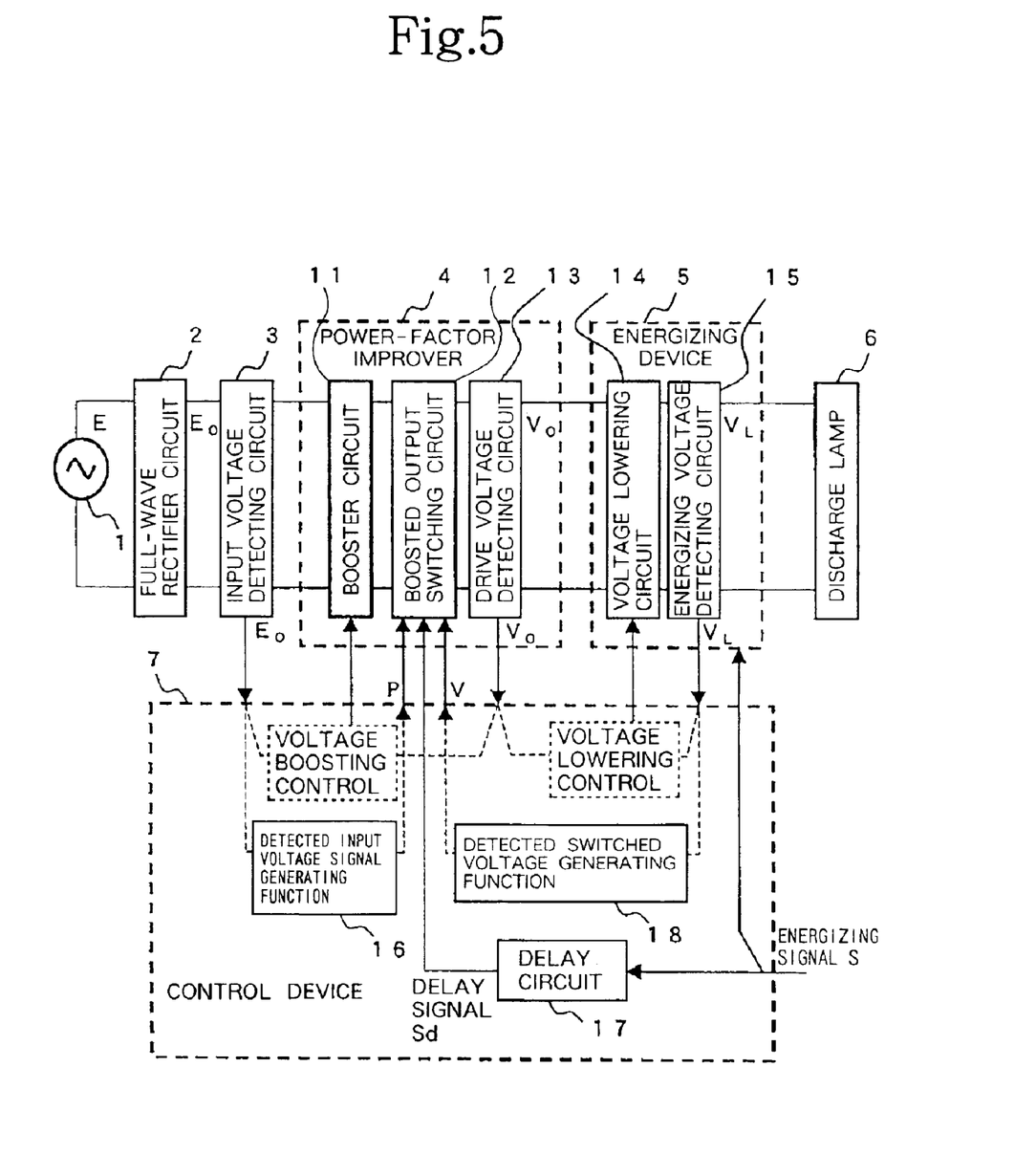
FIG. 5 is a block diagram of a basic arrangement of a discharge lamp energizing power supply device according to an embodiment of the present invention.

FIG. 5 shows in block form a basic arrangement of a discharge lamp energizing power supply device according to an embodiment of the present invention.

As shown in FIG. 5, the discharge lamp energizing power supply device (hereinafter referred to as "power supply device") comprises an AC/DC converter including full-wave rectifier circuit 2 for converting an input AC voltage E obtained from commercial AC power supply system 1 into a full-wave rectified waveform and booster circuit 11 for improving the power factor, the AC/DC converter boosting a rectified voltage value $E_O$ which is a maximum value of the full-wave rectified waveform and outputting the boosted voltage value for turning on discharge lamp 6 with an electric discharge therein, and a non-insulated DC/DC converter including voltage lowering circuit 14 for lowering the boosted voltage and outputting the lowered voltage to keep discharge lamp 6 energized after discharge lamp 6 is turned on by the electric discharge therein.

Specifically, full-wave rectifier circuit 2, rectified voltage detecting circuit 3, power-factor improver 4, and energizing device 5 are successively connected between commercial AC power supply system 1 and discharge lamp 6 and control device 7 is connected parallel to full-wave rectifier circuit 2, rectified voltage detecting circuit 3, power-factor improver 4, and energizing device 5.

Energizing device 5 outputs energizing output voltage $V_L$ for energizing discharge lamp 6. Power-factor improver 4 comprises booster circuit 11, boosted voltage changing circuit 12, and drive voltage detecting circuit 13, and operates as a circuit for improving the power factor depending on the function of control device 7 to control the boosting of the voltage. Energizing device comprises voltage lowering circuit 14 and energizing voltage detecting circuit 15. Control device 7 has, in addition to the above conventional functions detected input voltage signal generating function 16, delay circuit 17, and detected switched voltage generating function 18.

The discharge lamp energizing power supply device according to the present embodiment differs from the conventional discharge lamp energizing power supply device in that boosted voltage changing circuit 12 connected to the output of booster circuit 11 of power-factor improver 4 has upper and lower limit voltages set therein that are applicable to commercial power supply systems available in the world, and has its voltage boosting ratio continuously variable depending on a commercial power supply voltage E applied thereto, and that conditions for changing the voltage boosting ratio include a detected input voltage signal P based on the magnitude of the rectified voltage $E_O$ at the input of the power supply device, detected output voltage signal V based on the magnitude of the energizing output voltage $V_L$ at the output of the power supply device, and a delay signal Sd which is produced by delaying the energizing signal S that is input from outside of the power supply device for a predetermined period of time.

Control device 7 establishes an output signal of boosted voltage changing circuit 12 based on the rectified voltage $E_O$ or the energizing output voltage $V_L$ detected by its voltage detecting circuit, thereby controlling the voltage value of activating output voltage $V_O$ which is output from power-factor improver 4.

In control device 7, detected input voltage signal generating function 16 is supplied with the maximum full-wave-rectified voltage $E_O$ detected by rectified voltage detecting circuit 3 that is connected between full-wave rectifier circuit 2 and power-factor improver 4, and outputs the detected input voltage signal P for establishing the activating output voltage $V_O$ of power-factor improver 4 to boosted voltage changing circuit 12.

The rectified voltage $E_O$ is input from full-wave rectifier circuit 2 through rectified voltage detecting circuit 3 to power-factor improver 4. The rectified voltage $E_O$ applied to power-factor improver 4 is boosted by booster circuit 11 thereto to a boosted voltage at a predetermined voltage boosting ratio for improving the power factor. Booster circuit 11 as it is controlled by control device 7 provides a known booster chopper as shown in FIG. 2.

Boosted voltage changing circuit 12 of power-factor improver 4 which is supplied with the output signal from booster circuit 11 variably reduces the boosted voltage to an activating output voltage $V_O$ having a preset voltage value based on the detected input voltage signal P that is supplied from control device 7.

Control device 7 energizes activating device 5 with the energizing signal S that is input from outside of the power supply device, and outputs the delay signal Sd which has been delayed for a predetermined period of time by delay circuit 7 having a delay timer to boosted voltage changing circuit 12.

Boosted voltage changing circuit 12 outputs a predetermined maximum value $V_{Omax}$ of the activating output voltage $V_O$ regardless of any detected signal applied thereto until it is supplied with the delay signal Sd. When boosted voltage changing circuit 12 is supplied with the delay signal Sd from delay circuit 17, boosted voltage changing circuit 12 operates to lower the activating output voltage $V_O$ to a voltage value that is established by the detected input voltage signal P.

When energizing device 5 starts to operate in response to the energizing signal S in an initial lamp energization phase, energizing device 5 outputs the energizing output voltage $V_L$ depending on the maximum value $V_{Omax}$ of the activating output voltage $V_O$ from boosted voltage changing circuit 12. Thereafter, when the delay signal Sd that is produced from the energizing signal S by delay circuit 17 is applied to boosted voltage changing circuit 12, boosted voltage changing circuit 12 changes the activating output voltage $V_O$ to a voltage value $V_O$ that is established by the detected input voltage signal P. In energizing device 5, voltage lowering circuit 14 lowers the activating output voltage $V_O$ into an energizing output voltage $V_L$ depending on the output voltage value of power-factor improver 4, and outputs the energizing output voltage $V_L$.

As described above, when the energizing signal S is input from outside of the power supply device, energizing device 5 is supplied with the maximum value $V_{Omax}$ of the activating output voltage $V_O$ and outputs the energizing output voltage $V_L$ to energize discharge lamp 6. Thereafter, when the delay signal Sd that is produced after elapse of a predetermined delay time set by delay circuit 17 is input, boosted voltage changing circuit 12 of power-factor improver 4 lowers the activating output voltage $V_O$ to a voltage value indicated by the detected input voltage signal P. Therefore, even if the commercial AC voltage is of a low value, e.g., AC 100 V, the total electric power loss of power-factor improver 4 and energizing device 5 is reduced for higher efficiency, and the power supply device can be reduced in size and loss.

Detected input voltage signal generating function 16 will be described below with reference to FIG. 6 together with FIG. 5.

Figure 6:
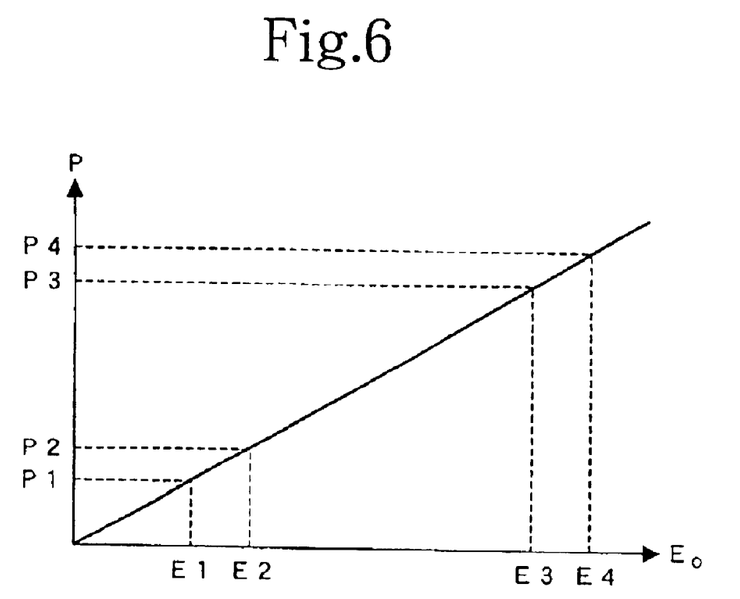
FIG. 6 is a diagram showing by way of example the relationship between a maximum voltage value $E_O$ output from a full-wave rectifier circuit of the discharge lamp energizing power supply device shown in FIG. 5 and a detected input voltage signal P for varying a boosted voltage depending on a change in the maximum voltage value $E_O$.

FIG. 6 is a diagram showing by way of example the relationship between the rectified voltage value $E_O$ detected by rectified voltage detecting circuit 3 and the detected input voltage signal P that is output to boosted voltage changing circuit 12 by detected input voltage signal generating function 16.

It is assumed that the voltage value of the detected input voltage signal P that is output from detected input voltage signal generating function 16 is proportional to the rectified voltage value $E_O$ output from full-wave rectifier circuit 2. Detected input voltage signal generating function 16 outputs the detected input voltage signal P which has a voltage value proportional to the rectified voltage value $E_O$ having a maximum voltage value of the full-wave rectified waveform to boosted voltage changing circuit 12.

Specifically, when detected input voltage signal generating function 16 is supplied with rectified voltage values E1, E2, E3, E4 as successive values of the rectified voltage value $E_O$, detected input voltage signal generating function 16 outputs a detected input voltage signal P1 in response to the rectified voltage value E1, a detected input voltage signal P2 in response to the rectified voltage value E2, a detected input voltage signal P3 in response to the rectified voltage value E3, and a detected input voltage signal P4 in response to the rectified voltage value E4.

Figure 7:
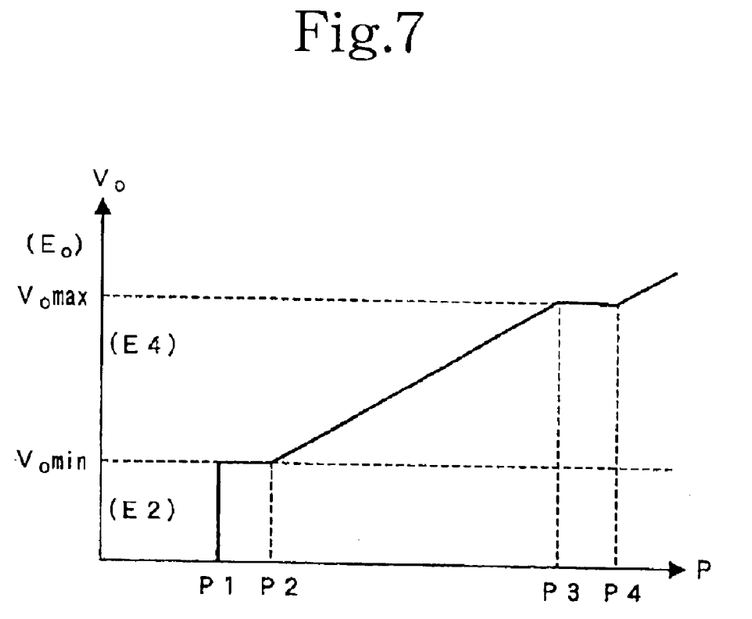
FIG. 7 is a diagram showing by way of example the relationship between a detected input voltage signal P and the voltage value of an activating output voltage $V_O$ output from a power-factor improver shown in FIG. 5.

FIG. 7 is a diagram showing by way of example the relationship between a detected input voltage signal P and the voltage value of an activating output voltage $V_O$ which is output by boosted voltage changing circuit 12 by changing the boosted voltage from booster circuit 11 based on the detected input voltage signal P.

The activating output voltage $V_O$ that is changed which is output from power-factor improver 4 including boosted voltage changing circuit 12 can have voltage values which are classified into three groups corresponding to respective three intervals of the detected input voltage signals P1, P2, P3, P4 having successively increasing values that are output from detected input voltage signal generating function 16.

The first interval is present between the detected input voltage signals P1, P2. In the first interval, boosted voltage changing circuit 12 keeps the activating output voltage $V_O$ at a constant minimum level $V_{Omin}$ irrespective of an increase in the voltage value of the detected input voltage signal P. The second interval is present between the detected input voltage signals P2, P3. In the second interval, boosted voltage changing circuit 12 increases the activating output voltage $V_O$ in proportion to the voltage value of the detected input voltage signal P. The third interval is present between the detected input voltage signals P3, P4. In the third interval, boosted voltage changing circuit 12 keeps the activating output voltage $V_O$ at a constant minimum level $V_{Omax}$ irrespective of an increase in the voltage value of the detected input voltage signal P.

Therefore, boosted voltage changing circuit 12 outputs the minimum value $V_{Omin}$ as the activating output voltage $V_O$ when it is supplied with a voltage value between the detected input voltage signals P1, P2 in the first interval. Boosted voltage changing circuit 12 outputs a voltage value between the minimum value $V_{Omin}$ and the maximum value $V_{Omax}$, which is proportional to the supplied voltage value, as the activating output voltage $V_O$ when it is supplied with a voltage value between the detected input voltage signals P2, P3 in the second interval. Boosted voltage changing circuit 12 outputs the maximum value $V_{Omax}$ as the activating output voltage $V_O$ when it is supplied with a voltage value between the detected input voltage signals P3, P4 in the third interval.

The rectified voltage $E_O$ representative of the maximum voltage value of the full-wave rectified waveform is required to be progressively greater in the order of the rectified voltage values E1, E2, E3, E4. The minimum voltage value $V_{Omin}$ of the activating output voltage $V_O$ produced by power-factor improver 4 is required to be greater than rectified voltage value E2. The maximum voltage value $V_{Omax}$ of the activating output voltage $V_O$ produced by power-factor improver 4 is required to be greater than the rectified voltage value E4 and have a sufficient voltage boosting ratio for providing a high power factor.

The activating output voltage $V_O$ produced by power-factor improver 4 and the discharging voltage $V_L$ output by energizing device 5 are required to be related to each other such that minimum voltage value $V_{Omin}$ is greater than the discharging voltage $V_L$ and the voltage lowering ratio needs to be of a value required for the voltage lowering chopper to operate.

If the rectified voltage $E_O$ exceeds the rectified voltage value E4 and the maximum voltage value $V_{Omax}$ of the activating output voltage $V_O$ is smaller than the rectified voltage $E_O$, then power-factor improver 4 stops operating as it constitutes a booster chopper circuit, and the voltage value $E_O$ in excess of the rectified voltage value E4 directly becomes an input voltage applied to energizing device 5.

The activating output voltage $V_O$ that is lower than the detected input voltage signal P1 corresponding to the rectified voltage value E1 does not reach the discharging output voltage $V_L$ for discharging discharge lamp 6, and hence does not exist as it should not be taken into account.

Before boosted voltage changing circuit 12 is supplied with the delay signal Sd from control device 7, boosted voltage changing circuit 12 outputs the activating output voltage $V_O$ that is fixed to the maximum voltage value $V_{Omax}$ regardless of the voltage value of the detected input voltage signal P.

A hardware circuit arrangement having the above functions is provided by a combination of circuits known to those skilled in the art, and its structural and functional details will not be described below.

Usually, the activating output voltage $V_O$ produced by power-factor improver 4 is generally output at the constant maximum voltage level $V_{Omax}$ even when the maximum voltage value $E_O$ of the full-wave rectified waveform changes from the voltage value E1 to the voltage value E1.

According to the present invention, however, it is possible to keep a constant voltage boosting ratio by changing the activating output voltage $V_O$ with respect to the input voltage E, and hence to lower the electric power loss caused by power-factor improver 4. If the input voltage E is low with respect to energizing device 5, then it is possible to lower the activating output voltage $V_O$ to reduce the Voltage lowering ratio for thereby reducing the electric power loss.

The relationship between the characteristics of the activating output voltage $V_O$ shown in FIG. 7 and the losses caused by power-factor improver 4 and energizing device 5 will be described below with reference to FIG. 2 which shows the booster chopper including booster circuit 11 and FIG. 3 which shows the voltage lowering chopper including voltage lowering circuit 14.

It can readily be seen from the arrangement of power-factor improver 4 including booster circuit 11 of the booster chopper shown in FIG. 2 that switching device 21 causes substantial losses in booster circuit 11.

The losses caused by switching device 21 include a loss in a turn-on state, a loss in a turn-off state, and a loss due to the resistance in the turn-off state. If switching device 21 comprises a ZVS (Zero Volt Switching) circuit, then the loss in the turn-off state, of all the losses caused by switching device 21, is nil.

The loss due to the resistance in the turn-off state is much smaller than the loss in the turn-off state. Therefore, the losses caused by switching device 21 are predominantly provided by the loss in the turn-off state thereof.

If switching device 21 comprises an FET (Field-Effect Transistor), then the loss in the turn-off state and the activating output voltage $V_O$ are related to each other as follows:

If switching device 21 comprises an FET and the duty cycle thereof is 50%, then the loss $P_{OFF}$ in the turn-off state thereof is expressed by the input voltage $E_O$ of power-factor improver 4, the turn-off time Tf of switching device 21, the inductance value L of choke coil 22, and the drain-to-source voltage Vds of switching device 21, according to the following equation (1):

$$P_{OFF} = \{E_O \times Tf/(12 \times L)\} \times Vds \qquad (1)$$

Since the expression "EO×Tf/(12×L) is a constant that does not change, it is replaced by a coefficient K and the equation (1) is rewritten as follows:

$$P_{OFF} = K \times Vds \qquad (2)$$

It can be seen from the equation (2) that in order to reduce the loss $P_{OFF}$ in the turn-off state, the drain-to-source voltage Vds of switching device 21 may be lowered. Thus, the loss $P_{OFF}$ in the turn-off state can be reduced by lowering the activating output voltage $V_O$. Therefore, the losses caused by switching device 21 can be reduced and the efficiency of power-factor improver 4 can be increased by lowering the output voltage $V_O$ of power-factor improver 4.

It can readily be seen from the arrangement of energizing device including voltage lowering circuit 14 of the booster chopper shown in FIG. 3 that switching device 41 and flywheel diode 43 cause substantial losses in voltage lowering circuit 14.

The losses caused by switching device 41 and flywheel diode 43 are considered as being classified into a loss due to a duty cycle and a loss due to switching operation.

It is assumed that switching device 41 comprises an FET.

The loss due to the duty cycle in the FET of switching device 41 is primarily attributable to a loss Pq due to the resistance $R_{ON}$ in the on-state thereof and a loss Pd due to the forward voltage Vf across flywheel diode 43.

These losses are expressed by the turn-on period $T_{ON}$ of switching device 41, the turn-off period $T_{OFF}$ of switching device 41, and an output current I thereof, according to the following equations (3), (4):

$$Pq = R_{ON} \times 2I \times \{T_{ON}/(T_{ON}+T_{OFF})\} \quad (3)$$

$$Pd = Vf \times I \times \{T_{OFF}/(T_{ON}+T_{OFF})\} \quad (4)$$

If the duty cycle is 50%, the resistance $R_{ON}$ is 0.5 ohm, and the forward voltage Vf is 3 volts in the above equations (3), (4), then the proportion of the loss caused by flywheel diode 43 in the total losses is greater.

In order to reduce the loss Pd, the turn-on period $T_{ON}$ may be increased and the turn-off period $T_{OFF}$ may be reduced, i.e., the activating output voltage $V_O$ input to voltage lowering circuit 14 may be lowered.

The loss due to the switching operation will be described below.

The loss Pt due to the switching operation is attributable to a loss $Pt_{ON}$ in the turn-on state of switching device 41 and a loss $Pt_{OFF}$ in the turn-off state of switching device 41.

These losses are expressed by the drain-to-source voltage Vds of switching device 41, the turn-on period $T_{ON}$ Of switching device 41, the turn-off period $T_{OFF}$ of switching device 41, and the oscillating frequency F thereof, according to the following equations (5), (6):

$$Pt_{ON} (I \times Vds \times T_{ON} \times F)/6 \quad (5)$$

$$Pt_{OFF} = (I \times Vds \times T_{OFF} \times F)/6 \quad (6)$$

Since the output current I, turn-on period $T_{ON}$, and the turn-off period $T_{OFF}$ are constant in the equations (5), (6), each of the losses depends on the drain-to-source voltage Vds of switching device 41.

In order to reduce the sum of the loss $Pt_{ON}$ and the loss $Pt_{OFF}$ due to the switching operation, the drain-to-source voltage Vds of switching device 41 may be lowered. That is, the losses can be reduced by lowering the activating output voltage $V_O$ that is input to voltage lowering circuit 14.

Consequently, because the losses caused by switching device 41 and flywheel diode 43 can be reduced by lowering the activating output voltage $V_O$ that is input to voltage lowering circuit 14, the efficiency of energizing device is increased.

Figure 8:
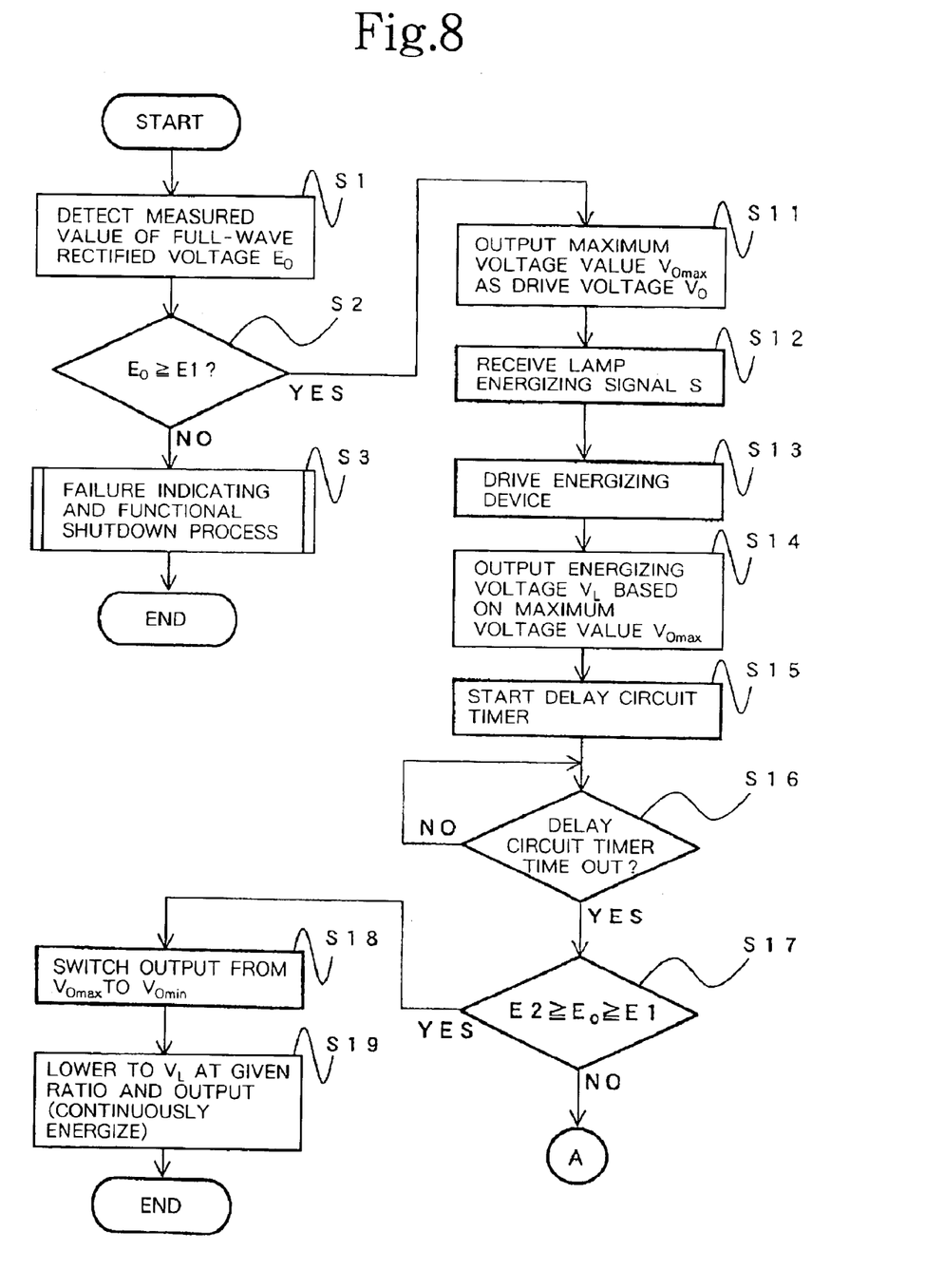
FIGS. 8 and 9 are a flowchart of a major operation sequence of the discharge lamp energizing power supply device shown in FIG. 5.
Figure 9:
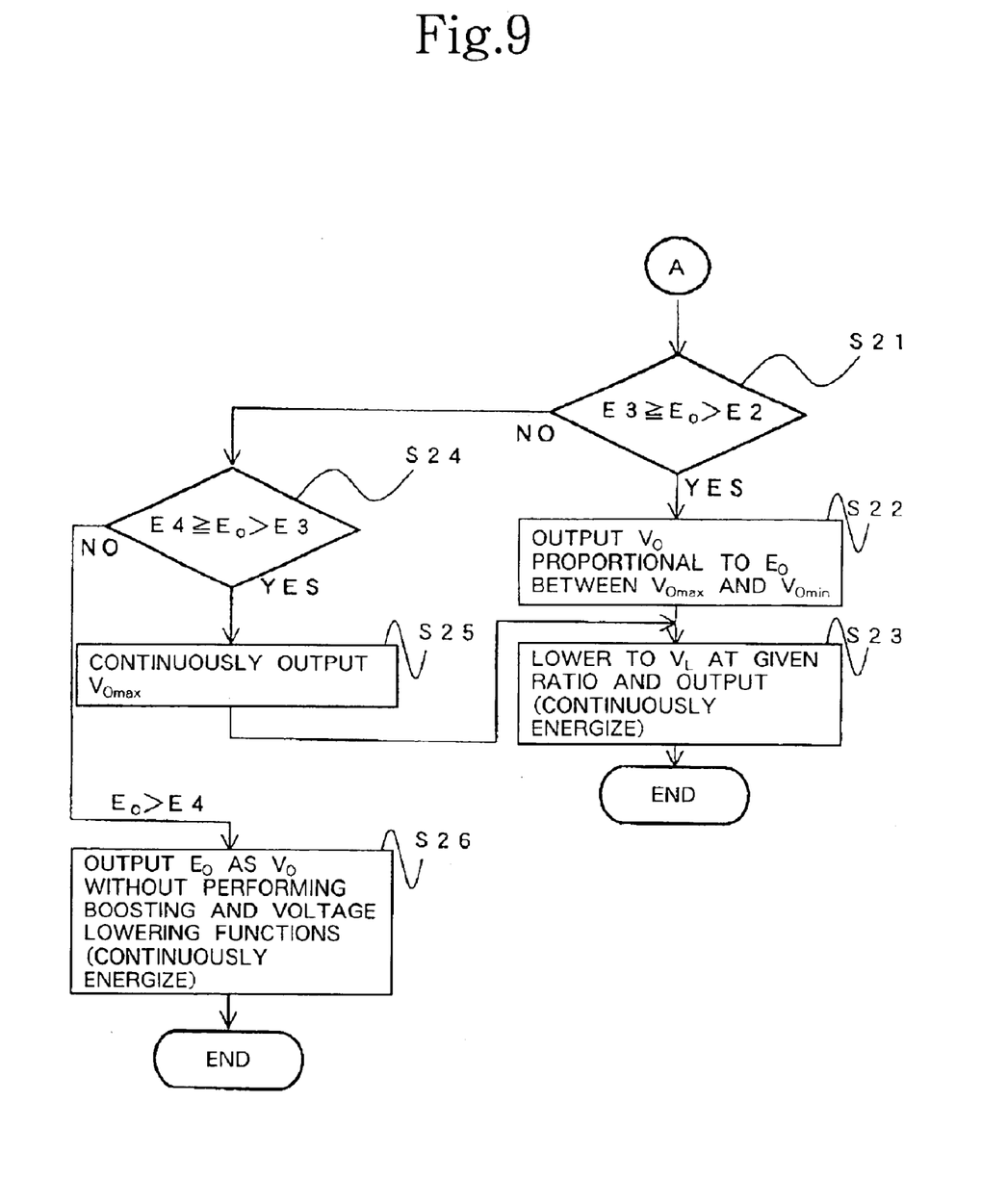

A primary operation sequence of control device 7 will be described below with reference to FIGS. 8 and 9 together with FIGS. 5 through 7.

When the power supply device receives the AC voltage E obtained from commercial AC power supply system 1, full-wave rectifier circuit 2 converts the AC voltage E into the maximum rectified voltage $E_O$.

Rectified voltage detecting circuit 3 detects a measured value of the rectified voltage $E_O$ applied thereto in step S1. Control device 7 determines whether or not the measured value is equal to or greater than a predetermined minimum rectified voltage value E1, e.g., 90 V, in step S2. If it is confirmed that the measured value is less than the minimum rectified voltage value E1, i.e., not in a predetermined range ("NO" in step S2), then control device 7 performs a process for indicating a power supply input failure to the user and stopping its function in step S3.

If it is confirmed that the measured value is equal to or greater than the minimum rectified voltage value E1, i.e., in the predetermined range ("YES" in step S2), then control device 7 controls boosted voltage changing circuit 12 to output the maximum drive voltage value $V_{Omax}$ in step S11.

Then, control device 7 receives an energizing signal S for energizing discharge lamp 6 from outside of the power supply device in step S12. Control device 7 drives energizing device 5 to output the maximum drive voltage value $V_{Omax}$ from boosted voltage changing circuit 12 of power-factor improver 4 in step S13. Control device 7 controls energizing device 5 to output the energizing output voltage $V_L$ as a discharging voltage to discharge lamp 6, thus turning on discharge lamp 6 in step S14. Then, control device 7 starts the timer of delay circuit 17 in step S15.

Control device 7 confirms whether the timer of delay circuit 17 has timed out or not in step S16. If the timer of delay circuit 17 has timed out, then control device 7 determines whether the rectified voltage $E_O$ is of a value ranging from the voltage value E1 to the voltage value E2 or not in step S17.

If the rectified voltage $E_O$ is the voltage value E1, the voltage value E2, or a value therebetween ("YES" in step S17), then detected input voltage signal generating function 16 of control device 7 delivers one of the detected input voltage signals P1, P2 to boosted voltage changing circuit 12, switching the maximum drive voltage value $V_{Omax}$ that has been output so far to the minimum voltage value $V_{Omin}$ in step S18. As a result, the voltage lowering circuit 14 of energizing device 5 lowers the voltage at a predetermined ratio, and energizing device 5 outputs the discharging voltage $V_L$ matching the minimum voltage value $V_{Omin}$ to discharge lamp 6 in step S19, keeping the electric discharge in discharge lamp 6 to continuously energize discharge lamp 6.

If the rectified voltage $E_O$ is in excess of the voltage value E2 ("NO" in step S17), then control device 7 confirms whether or not the rectified voltage $E_O$ is equal to or lower than the voltage value E3 in step S21. If it is confirmed that the rectified voltage $E_O$ is equal to or lower than the voltage value E3, then control device 7 controls boosted voltage changing circuit 12 to output the activating output voltage $V_O$ that is proportional to the rectified voltage $E_O$ between the minimum activating output voltage value $V_{Omin}$ and the maximum activating output voltage value $V_{Omax}$, from power-factor improver 4 to energizing device 5 in step S22. Energizing device 5 then outputs the energizing discharging voltage $V_L$, which is produced by lowering the activating output voltage $V_O$ from power-factor improver 4 with voltage lowering circuit 14, to discharge lamp 6 to keep discharge lamp 6 energized in step S23.

If it is confirmed that the rectified voltage $E_O$ is in excess of the voltage value E3 in step S21, then control device 7 confirms whether or not the rectified voltage $E_O$ is equal to or lower than the voltage value E4 in step S24. If it is confirmed that the rectified voltage $E_O$ is equal to or lower than the voltage value E4, then control device 7 does not change its control over the various circuits, but continuously outputs the activating output voltage $V_O$ having the maximum activating voltage value $V_{Omax}$ in step S25.

If it is confirmed that the rectified voltage $E_O$ is in excess of the voltage value E4 in step S24, then control device 7, then control device 7 controls power-factor improver 4 and energizing device 5 to output the rectified voltage $E_O$ supplied from full-wave rectifier circuit 2 as the energizing discharging voltage $V_L$ to discharge lamp 6 to keep discharge lamp 6 energized, without performing the functions of booster circuit 11 and voltage lowering circuit 14, in step S26.

A process performed by control device 7 to control boosted voltage changing circuit 12 by detecting the discharging voltage $V_L$ output from energizing device 5 and generating detected switched voltage signal V will be described below.

Discharge lamp 6 has its internal impedance changed due to its individual characteristic variations and aging over a long period of time, and the energizing output voltage $V_L$ applied from energizing device 5 is not constant, but tends to vary from a minimum energizing output voltage value $V_{Lmin}$ to a maximum energizing output voltage value $V_{Lmax}$. As described above, it is necessary that the minimum voltage value $V_{Omin}$ of the drive output voltage $V_O$ from power-factor improver 4 be greater than the energizing output voltage $V_L$, and a voltage lowering ratio required for the voltage lowering chopper of voltage lowering circuit 14 to operate be, maintained.

If discharge lamp 6 requires an energizing output voltage $V_L$ which is higher than the energizing output voltage $V_{LO}$ that is output from energizing device 5 when it is driven by the minimum voltage value $V_{Omin}$, then the voltage lowering chopper of voltage lowering circuit 14 cannot keep itself and stops operating.

To solve the above problem, when the energizing output voltage $V_{LO}$ is detected by energizing voltage detecting circuit 15 which detects the output voltage of voltage lowering circuit 14 included in energizing device 5, detected switched voltage generating function 18 of control device 7 receives the energizing output voltage $V_{LO}$ and outputs the detected output voltage signal V. When boosted voltage changing circuit 12 is supplied with the detected output voltage signal V from detected switched voltage generating function 18, boosted voltage changing circuit 12 fixes the output of power-factor improver 4 to the drive output voltage $V_{Omax}$. As a result, even in a situation where discharge lamp 6 needs the energizing output voltage $V_L$ which is higher than the energizing output voltage $V_{LO}$, discharge lamp 6 is prevented from being turned off.

In the above description, the input and output voltages that control the boosted voltage changing circuit are specifically limited by the illustrated graphs and symbols. However, the control device may be of any arrangement and should not be limited to the details in the above description insofar as it can control the boosted voltage changing circuit based on the input and output voltages of the power supply device to set the activating output voltage in an appropriate operating range of the voltage lowering circuit, when the voltage for keeping the electric discharge in the discharge lamp is continuously output.

In the above description, the illustrated functional blocks and operation sequence have been referred to. However, various changes and modifications including separating and combining the functions or switching around certain steps of the operation sequence can freely be made as long as the above functions are performed. Therefore, the above description should not limit the present invention. Furthermore, the principles of the present invention are also applicable to a general range of discharge lamp energizing power supply devices.

According to the present invention, as described above, there is provided a discharge lamp energizing power supply device which is operable to reduce an electric power loss with respect to low commercial power supply voltages in a wide range of commercial power supply voltages employed in various parts of the world, and which can stably perform its functions without causing a functional shutdown of a boosting circuit due to an increase in the power supply voltage and a functional shutdown of a voltage lowering circuit due to a characteristic deterioration of a discharge lamp.

The reasons why such a discharge lamp energizing power supply device is provided by the present invention are that under conditions in which the power supply device causes a large loss, i.e., under conditions in which the AC voltage E and the energizing output voltage $V_L$ are low, the drive output voltage $V_O$ is lowered to improve the efficiency, and under conditions in which the power supply device causes a small loss, i.e., under conditions in which the AC voltage E and the energizing output voltage $V_L$ are high, the drive output voltage $V_O$ is not changed, but the power supply device operates in a normal mode.

Specifically, the power-factor improver which provides a power-factor improving circuit has the boosted voltage changing circuit for changing the activating output voltage, and the energizing output voltage that is output from the boosted voltage changing circuit to the energizing device is lowered after the energization of the discharge lamp energized by the energizing device is stabilized, i.e., the voltage boosting ratio is reduced to reduce the loss caused by the power-factor improving circuit and simultaneously to reduce the loss caused by the energizing device. When the energizing output voltage rises up to a predetermined value due to a deterioration of the discharge lamp at the time the commercial AC voltage is low, the maximum value of the activating output voltage is applied to the energizing device to avoid a functional shutdown of the voltage lowering circuit.

Therefore, even if a low commercial AC voltage such as of AC 100 volts is applied, the total loss of the power-factor improving circuit and the energizing device is improved for higher efficiency after energization of the discharge lamp is stabilized. The power supply device can be reduced in size and loss, and the discharge lamp can be kept energized even when it is deteriorated.

While a preferred embodiment of the present invention has been described using specific terms, such description is for illustrative purposes only, and it is to be understood that changes and variations may be made without departing from the spirit or scope of the following claims.

What is claimed is:

1. A discharge lamp energizing power supply device comprising:
   a full-wave rectifier circuit for rectifying an AC voltage obtained from a commercial AC power supply system into a full-wave rectified waveform;
   a booster circuit for boosting the voltage of the full-wave rectified waveform;
   a boosted-voltage changing circuit for changing the boosted voltage output from said booster circuit;
   a voltage lowering circuit for lowering an output voltage from said boosted-voltage changing circuit and outputting an activating output voltage for activating a discharge lamp to turn on the discharge lamp and an energizing output voltage for keeping the discharge lamp energized; and
   a control device for controlling a boosted voltage in said boosted-voltage changing circuit within a predetermined range based on the voltage of said full-wave rectified waveform when said voltage lowering circuit outputs the energizing output voltage.

2. A discharge lamp energizing power supply device according to claim 1, further comprising:
   an energizing voltage detecting circuit for detecting the output voltage of said voltage lowering circuit;
   wherein said control device sets the boosted voltage in said boosted-voltage changing circuit to a maximum value of said predetermined range if the output voltage of said voltage lowering circuit is detected as having reached the energizing output voltage by said energizing voltage detecting circuit while the boosted voltage in said boosted-voltage changing circuit is being set to a minimum value of said predetermined range.

3. A discharge lamp energizing power supply device according to claim 1, wherein said control device controls the boosted voltage in said boosted-voltage changing circuit in a predetermined range at the voltage value of said activating output voltage when said voltage lowering circuit outputs the activating output voltage.

4. A discharge lamp energizing power supply device according to claim 1, wherein said full-wave rectifier circuit outputs a rectified voltage value $E_O$ as a maximum value of the full-wave rectified waveform produced from the AC voltage obtained from the commercial AC power supply system;

said booster circuit and said boosted-voltage changing circuit jointly providing a power-factor improver for receiving the rectified voltage value $E_O$ of the full-wave rectified waveform, boosting the voltage value of the rectified voltage value $E_O$ to improve the power factor thereof, and outputting the boosted voltage value as an activating output voltage $V_O$;

said voltage lowering circuit providing an energizing device for lowering the output voltage of said power-factor improver and outputting the activating output voltage $V_O$ for activating the discharge lamp to turn on the discharge lamp and the energizing output voltage $V_L$ for keeping the discharge lamp energized;

wherein said discharge lamp energizing power supply device further comprising detecting circuits for detecting, respectively, said rectified voltage $E_O$ as an input voltage, said activating output voltage $V_O$, and said energizing output voltage $V_L$; and wherein said control device changes said activating output voltage $V_O$ output from said power-factor improver in response to the detected voltages from said detecting circuits, changes said activating output voltage $V_O$ output from said boosted-voltage changing circuit within a range from a minimum value $V_{Omin}$ to a maximum value $V_{Omax}$ based on said rectified voltage $E_O$ after said discharge lamp has started to operate stably, and controls said boosted-voltage changing circuit to set said activating output voltage $V_O$ to said maximum value $V_{Omax}$ of said range when the output voltage of said energizing device reaches said energizing output voltage $V_L$ while said activating output voltage $V_O$ is being set to said minimum value $V_{Omin}$ of said range.

5. A discharge lamp energizing power supply device according to claim 4, wherein said range for said activating output voltage $V_O$ extends from said minimum value $V_{Omin}$ to said maximum value $V_{Omax}$ based on said rectified voltage $E_O$, and is divided into first, second, and third intervals which are successively arranged as said rectified voltage $E_O$ increases, and said control device controls said boosted-voltage changing circuit to keep said activating output voltage $V_O$ constant at said minimum value $V_{Omin}$ regardless of an increase in said rectified voltage $E_O$ in said first interval, to allow said activating output voltage $V_O$ to increase in proportion to said rectified voltage $E_O$ in said second interval, and to keep said activating output voltage $V_O$ constant at said maximum value $V_{Omax}$ regardless of an increase in said rectified voltage $E_O$ in said third interval.

6. A discharge lamp energizing power supply device according to claim 4, wherein said control device has a delay circuit, and said control device controls said boosted-voltage changing circuit to increase said activating output voltage $V_O$ up to said maximum value $V_{Omax}$ and activates said delay circuit when an energizing signal S is received from outside of the discharge lamp energizing power supply device, and to reduce said activating output voltage $V_O$ to a voltage value in said range which is set based on said rectified voltage $E_O$ when said delay circuit confirms elapse of a predetermined period of time.

7. A discharge lamp energizing power supply device according to claim 6, wherein said range for said activating output voltage $V_O$ extends from said minimum value $V_{Omin}$ to said maximum value $V_{Omax}$ based on said rectified voltage $E_O$, and is divided into first, second, and third intervals which are successively arranged as said rectified voltage $E_O$ increases, and said control device controls said boosted-voltage changing circuit to keep said activating output voltage $V_O$ constant at said minimum value $V_{Omin}$ regardless of an increase in said rectified voltage $E_O$ in said first interval, to allow said activating output voltage $V_O$ to increase in proportion to said rectified voltage $E_O$ in said second interval, and to keep said activating output voltage $V_O$ constant at said maximum value $V_{Omax}$ regardless of an increase in said rectified voltage $E_O$ in said third interval.

8. A discharge lamp energizing power supply device according to claim 7, wherein said booster circuit comprises a booster chopper having a sufficient voltage boosting ratio to achieve a high power factor under such condition as to make a maximum value of said rectified voltage $E_O$ in said first interval smaller than the minimum value $V_{Omin}$ of said activating output voltage $V_O$, and said voltage lowering circuit comprises a voltage lowering chopper having a voltage lowering ratio required to operate the voltage lowering chopper under such conditions as to make said energizing output voltage $V_L$ smaller than the minimum value $V_{Omin}$ of said activating output voltage $V_O$.

* * * * *